United States Patent
Turner et al.

(10) Patent No.: US 11,156,173 B2
(45) Date of Patent: Oct. 26, 2021

(54) LEAK DETECTION IN A HYDROGEN FUELLED VEHICLE

(71) Applicant: ULEMCO LIMITED, Aintree (GB)

(72) Inventors: Paul Turner, Brentwood (GB); Trevor Jasper, Brentwood (GB)

(73) Assignee: ULEMCO LIMITED, Liverpool (GB)

(*) Notice: Subject to any disclaimer, the term of this patent is extended or adjusted under 35 U.S.C. 154(b) by 0 days.

(21) Appl. No.: 16/963,223

(22) PCT Filed: Jan. 18, 2019

(86) PCT No.: PCT/GB2019/050146
§ 371 (c)(1),
(2) Date: Jul. 18, 2020

(87) PCT Pub. No.: WO2019/145686
PCT Pub. Date: Aug. 1, 2019

(65) Prior Publication Data
US 2021/0047971 A1    Feb. 18, 2021

(30) Foreign Application Priority Data
Jan. 23, 2018  (GB) .................................. 1801094

(51) Int. Cl.
*F02D 19/02*    (2006.01)
*F02D 41/22*    (2006.01)
(Continued)

(52) U.S. Cl.
CPC ....... *F02D 19/025* (2013.01); *F02D 19/0623* (2013.01); *F02D 19/0644* (2013.01);
(Continued)

(58) Field of Classification Search
CPC ............... F02D 19/025; F02D 19/0623; F02D 19/0644; F02D 41/22; F02D 2041/225;
(Continued)

(56) References Cited

U.S. PATENT DOCUMENTS

2004/0035401 A1*  2/2004  Ramachandran ....... F02B 43/10
                                                     123/527
2005/0247123 A1*  11/2005  Fuse ................... G01F 23/0061
                                                     73/290 R
(Continued)

FOREIGN PATENT DOCUMENTS

| DE | 102015012220 A1 | 3/2017 |
| JP | 0785883 A | 3/1995 |
| JP | 2004139842 A | 5/2004 |

OTHER PUBLICATIONS

European Patent Office, English Abstract for JP0785883 A, copyright 1995.
(Continued)

*Primary Examiner* — Mahmoud Gimie
(74) *Attorney, Agent, or Firm* — Cahn & Samuels, LLP

(57) ABSTRACT

The invention concerns a method of detecting hydrogen leakage from a power plant installation using hydrogen as fuel. A rate of supply of hydrogen to the power plant ("the supply rate") is determined. A rate of change of mass of hydrogen in the tank arrangement ("the rate of mass change") is determined. The supply rate is compared with the rate of mass change to determine whether leakage is taking place.

19 Claims, 1 Drawing Sheet

(51) Int. Cl.
*H01M 8/04082* (2016.01)
*F02D 19/06* (2006.01)
*F02M 21/02* (2006.01)
*G01M 3/26* (2006.01)
*H01M 8/04664* (2016.01)

(52) U.S. Cl.
CPC ......... *F02D 41/22* (2013.01); *F02M 21/0206* (2013.01); *F02M 21/0293* (2013.01); *G01M 3/26* (2013.01); *H01M 8/04201* (2013.01); *H01M 8/04664* (2013.01); *F02D 2041/225* (2013.01)

(58) Field of Classification Search
CPC . F02M 21/0206; F02M 21/0293; G01M 3/26; H01M 8/04201; H01M 8/04664
USPC ......................................................... 123/525
See application file for complete search history.

(56) References Cited

U.S. PATENT DOCUMENTS

| | | | |
|---|---|---|---|
| 2009/0035612 A1* | 2/2009 | Suematsu | H01M 8/04089 429/432 |
| 2009/0253008 A1* | 10/2009 | Ishikawa | H01M 8/04089 429/429 |
| 2010/0104905 A1* | 4/2010 | Ishikawa | H01M 8/04089 429/445 |
| 2010/0233562 A1* | 9/2010 | Kajiwara | G01M 3/007 429/444 |
| 2011/0301826 A1 | 12/2011 | Galindo et al. | |
| 2017/0010178 A1 | 1/2017 | Cho et al. | |
| 2018/0149096 A1* | 5/2018 | Johns | F02D 19/0644 |
| 2018/0233755 A1* | 8/2018 | Saito | H01M 8/04679 |

OTHER PUBLICATIONS

UK Intellectual Property Office, search report for GB Application No. GB1801094.2, dated Jul. 27, 2018, pp. 1-3.
European Patent Office, International Search Report for PCT Application No. PCT/GB2019/050146, dated Mar. 13, 2019, pp. 1-4.
European Patent Office, Written Opinion for PCT Application No. PCT/GB2019/050146, dated Mar. 13, 2019, pp. 1-7.

* cited by examiner

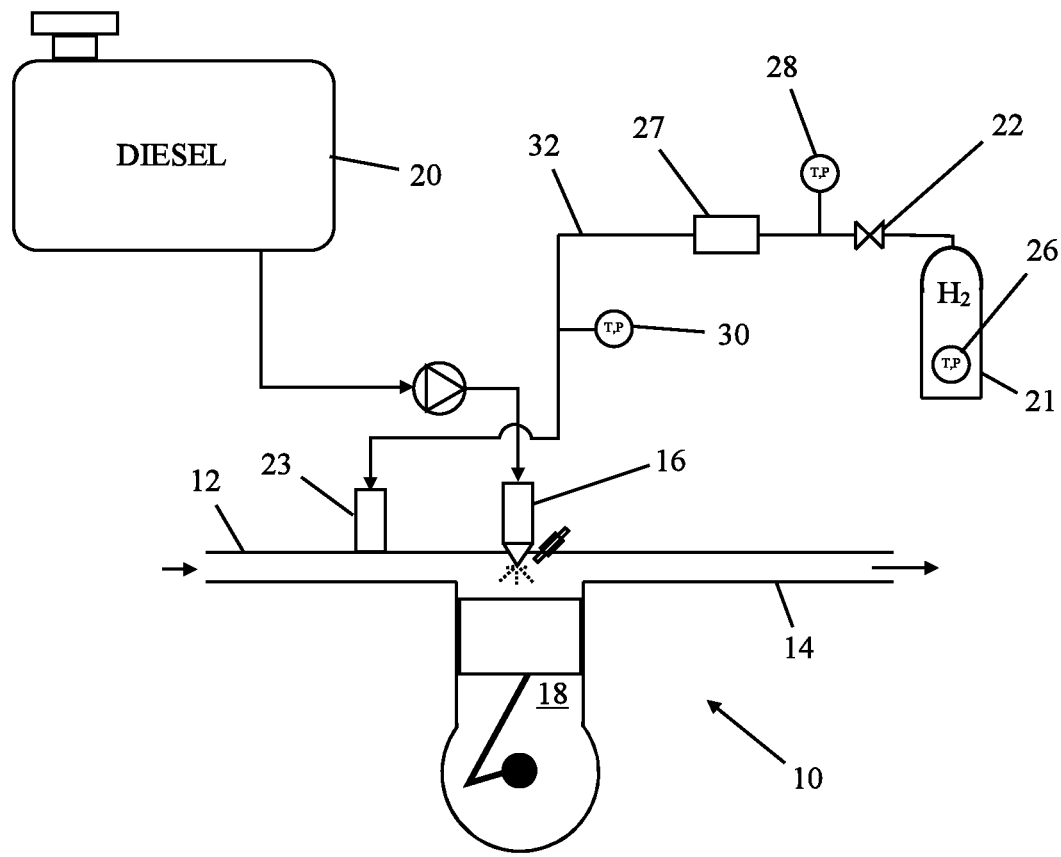

LEAK DETECTION IN A HYDROGEN FUELLED VEHICLE

The invention is concerned with detection of leakage of hydrogen in a vehicle which is at least partly hydrogen fuelled.

There are powerful economic and societal incentives to reduce the consumption of hydrocarbon based fuels in the internal combustion engines of vehicles. Release of carbon by their combustion is thought to be a major contributor to global warming. The Earth's resources of crude oil are finite, and its extraction harms the environment in various ways.

Hydrogen has long been suggested as a substitute for hydrocarbon based fuels and the modern focus on reduction of carbon release into the atmosphere has only increased its attraction in this respect. But for a range of technical and social reasons widespread adoption of hydrogen fuelling of vehicles has not taken place at the time of writing.

One concern about the use of hydrogen to fuel vehicles is the apparent hazard associated with any accidental leakage. Hydrogen is often stored on-board such vehicles at high pressure. Hydrogen is of course potentially explosive at sufficiently high concentrations. There is a widespread perception that escaping hydrogen poses an explosion risk.

The real severity of this risk is open to question. Because of its very low density, hydrogen released into the atmosphere rises and so disperses very rapidly. It is consequently unlikely that a concentration sufficient to cause an explosion could be created by the fuelling system of a vehicle. Be that as it may, there are legal requirements for detection of hydrogen leakage from such systems.

This presents a technical challenge. Leakage of denser gases such as the natural gas used in mains supply systems can be detected by detecting the gas itself in the vicinity of a leak. But this approach is less effective in relation to hydrogen because of the rapid dispersion already referred to. A vehicle provides various possible points of leakage and providing each with a local detector is not considered feasible.

So a means is needed for detection of leakage of hydrogen in relation to a vehicle which is at least partially hydrogen fuelled.

The vehicle in question may in principle be driven by a hydrogen burning internal combustion engine, or by a hydrogen fuel cell powering an electric motor, or by an internal combustion engine fuelled on a combination of hydrogen with another fuel. The term "power plant" is used herein to refer to any of these devices, and to any engine or other machine or arrangement which receives hydrogen as fuel and which is able to provide mechanical power.

A specific embodiment of the present invention will now be described, by way of example only, with reference to the accompanying drawing.

FIG. 1 is a schematic representation of parts of an engine and its fueling system operable in accordance with the invention.

The embodiment of the invention described herein is implemented in relation to a vehicle engine 10 which is an internal combustion engine fuelled by a mixture of hydrogen and a hydrocarbon fuel, specifically diesel.

The engine 10 has an air intake manifold 12, an exhaust 14, and a set of fuel injectors 16 and 23 associated with respective combustion chambers 18, only one of which is seen in the drawings. Diesel fuel is drawn from a tank 20 and supplied to the injectors 16. Hydrogen is stored in pressure tank 21 in liquid or gaseous form and at high pressure (which purely by way of example may be in the range of 35 to 70 MPa), and is supplied to the engine fuel intake manifold via a tank valve 22, a high pressure regulator unit 27 and injectors 23.

Operation of the engine is under the control of an electronic processing system represented in the drawing as an ECU (electronic control unit) 24. Control connections from the ECU 24 are not represented in the drawings for the sake of simplicity. Note that while a single ECU 24 is depicted and described, the processing tasks involved in engine management and in leak detection may in practice be carried out by separate devices.

Sensors 26 are provided for monitoring the quantity of fuel in the hydrogen fuel tank 21. More specifically, what the sensors are used to monitor in the present embodiment is mass of hydrogen in the tank. The sensors 26 detect temperature and pressure of the hydrogen in the tank. The volume of the tank is known, as is the relationship between density, temperature and pressure of the stored hydrogen. This relationship is close to the ideal gas law, according to which the product of pressure and volume is proportional to the product of mass and temperature, although the true relationship is slightly more complex, deviating slightly from a truly linear relationship. The behaviour of compressed gases is very well known to the skilled person and this aspect requires no further explanation in the present context.

Based on the measured temperature and pressure, and the known tank volume, the ECU 24 determines the mass of hydrogen in the tank 21. One could equivalently say that the ECU 24 determines the number of moles of $H_2$.

Further sensor stations 28, 30 measure temperature and pressure in lines 32 leading from the tank 21 to the engine 10 at locations upstream and downstream of the pressure regulator unit 24, respectively. Their outputs are used to establish the mass of hydrogen in the lines 32.

The leak monitoring system is used whilst the engine is not running to perform static leak testing. This may for example be carried out after the engine has been switched off ("key off") and/or when the engine is started ("key on"). Values from a key off test and the next key on test may be compared to test for leakage taking place during inactive periods. An increase in hydrogen mass from key off to key on may of course be attributed to fuelling of the vehicle, and may be ignored.

A static leak test comprises taking at least two temporally separated measurements of temperature and pressure, and calculating from them the mass of hydrogen in the lines (if the tank valve 22 is closed) or in the tank and the lines 32 (if the tank is open). If the mass calculated from the second measurement is lower than that calculated from the first by more than a certain margin, this is interpreted as being indicative of leakage of hydrogen and suitable action is triggered in response, such as provision of a visual or audible warning for a driver.

The static leak may involve more than two tests. It may include multiple measurements to reduce the effect of noise. It may comprise numerical differentiation of the calculated mass such that a leak is inferred if the mass reduces at anything above a threshold rate.

The leak monitoring system is also used to carry out dynamic leak testing whilst the engine is running. For this purpose an estimate is made of the mass per unit time of hydrogen supplied to the engine 10. This estimate can be made from engine operating parameters known to the ECU 24, which may comprise the control signals applied to the injectors 16 and the regulator unit 24. The rate of hydrogen consumption estimated in this manner is compared to the rate of change of the mass of hydrogen in the tank 20 and the lines 32, calculated from the outputs of the sensor stations 26, 28, 30. If the latter is found to be greater than the former, this is suggestive of a leak.

In principle, the system could, in response to this condition, determine that leakage is taking place and provide a suitable response, e.g. by shutting down the engine and other systems and giving the driver a warning signal. But a problem arises due to limited sensor resolution. Pressure in the hydrogen tank 21 is high—it may for example by 70 mPa when full, in a typical system. A small error in the sensed tank pressure or temperature can create an error in the tank mass which is large in proportion to the rate of consumption of hydrogen by the engine, potentially causing the dynamic leak process to yield a "false positive"—an indication of a leak where none is actually taking place.

The problem is obviated in the present embodiment in the following manner.

In response to a positive outcome of a dynamic leak detection test, the system does not immediately shut down the engine. Instead, hydrogen supply to the engine 10 is suspended. The engine is fuelled solely with diesel while a static leak test is carried out in the manner described above. If the static leak test is negative then it is determined that there is no leakage and hydrogen fuelling re-commences. If the static leak test is positive then the system responds accordingly, e.g. with a driver warning and/or automatic engine shutdown.

The invention claimed is:

1. A method of detecting hydrogen leakage from an installation comprising a power plant which is wholly or partially fuelled by hydrogen supplied to the power plant from a tank arrangement having a known volume, the method being carried out while the power plant is running and comprising:
    determining a rate of supply of hydrogen to the power plant ("the supply rate");
    sensing pressure and temperature in the tank arrangement and determining from the sensed pressure and temperature and from the known volume for the tank arrangement a rate of change of mass of hydrogen in the tank arrangement ("the rate of mass change"); and
    comparing the supply rate with the rate of mass change to determine whether leakage is taking place.

2. The method as claimed in claim 1, wherein the tank arrangement further includes at least one hydrogen supply line leading from the tank to the power plant, and the method further comprises sensing temperature and pressure in the supply line, the rate of mass change being based on the sum of a rate of mass change in the tank and a rate of mass change in the supply line.

3. The method as claimed in claim 2, wherein the hydrogen supply line includes a pressure regulator and the method further comprises sensing temperature and pressure at two points in the supply line, one upstream of the pressure regulator and the other downstream of the pressure regulator.

4. The method as claimed in claim 1, wherein the power plant is an internal combustion engine having at least one fuel injector and the method comprises determining the rate of supply of hydrogen to the engine based on engine operating parameters including a state of the fuel injector.

5. The method as claimed in claim 1, wherein the power plant is arranged to be fuelled by hydrogen and by a second fuel, the method further comprising:
    making a first determination whether leakage is taking place by comparison of the supply rate with the rate of mass change,
    in the event that the first determination is indicative of leakage, suspending a supply of hydrogen to the power plant and fuelling the power plant with the second fuel during the suspension of the hydrogen supply, and
    making a second determination whether leakage is taking place by making at least two temporally separated measurements of mass of hydrogen in the tank arrangement.

6. The method as claimed in claim 5, wherein an action responsive to leakage is initiated if the second determination is indicative of leakage.

7. The method as claimed in claim 1 implemented on board a vehicle powered by the power plant.

8. A power plant installation configured to operate according to the method of claim 1.

9. The method as claimed in claim 1, wherein the supply rate is determined from operating parameters of the power plant.

10. A computer program embodied on a computer readable storage medium which, when run on an engine controller, causes it to operate according to the method of claim 1.

11. A system for detection of hydrogen leakage from an installation comprising a power plant fuelled at least partly with hydrogen and a tank arrangement having a known volume for storing hydrogen and supplying hydrogen to the power plant, the system comprising
    a sensor arrangement for sensing temperature and pressure in a tank of the tank arrangement; and
    a digital processor configured to:
        determine a rate of supply of hydrogen to the power plant while the power plant is running ("the supply rate");
        determine a rate of change of mass of hydrogen in the tank arrangement from the sensed temperature and pressure from the sensor and from the known volume of the tank arrangement ("the rate of mass change"); and
        compare the supply rate with the rate of mass change to determine whether leakage is taking place.

12. The system for detection of hydrogen leakage as claimed in claim 11 further comprises a further sensor arrangement for sensing a temperature and a pressure in a supply line leading from the tank to the power plant.

13. The system for detection of hydrogen leakage as claimed in claim 11, wherein the tank arrangement further includes at least one hydrogen supply line leading from the tank to the power plant, and the system further comprising a further sensor located to sense a temperature and a pressure in the supply line, the rate of mass change being based on the sum of a rate of mass change in the tank and a rate of mass change in the supply line.

14. The system for detection of hydrogen leakage as claimed in claim 13, wherein the at least one hydrogen supply line includes a pressure regulator and a further second sensor located to sense a temperature and a pressure at a second point in the supply line such that one further sensor is upstream of the pressure regulator and the other further sensor is downstream of the pressure regulator.

15. The system for detection of hydrogen leakage as claimed in claim 11, wherein the power plant is an internal combustion engine having at least one fuel injector and the digital processor is configured to determine the rate of supply of hydrogen to the engine based on engine operating parameters including a state of the fuel injector.

16. The system for detection of hydrogen leakage as claimed in claim 11, wherein the power plant is arranged to be fuelled by hydrogen and by a second fuel, the digital processor being further configured to:

make a first determination whether leakage is taking place by comparison of the supply rate with the rate of mass change, in the event that the first determination is indicative of leakage, suspend a supply of hydrogen to the power plant and fuelling the power plant with the second fuel during the suspension of hydrogen supply, and make a second determination whether leakage is taking place by making at least two temporally separated measurements of mass of hydrogen in the tank arrangement.

17. The system for detection of hydrogen leakage as claimed in claim 16, wherein the digital processor is further configured to initiate an action responsive to leakage if the second determination is indicative of leakage.

18. The system for detection of hydrogen leakage as claimed in claim 11, wherein the power plant is an internal combustion engine.

19. The system as claimed in claim 11, wherein the digital processor is further configured to determine the supply rate from operating parameters of the power plant.

\* \* \* \* \*